UNITED STATES PATENT OFFICE.

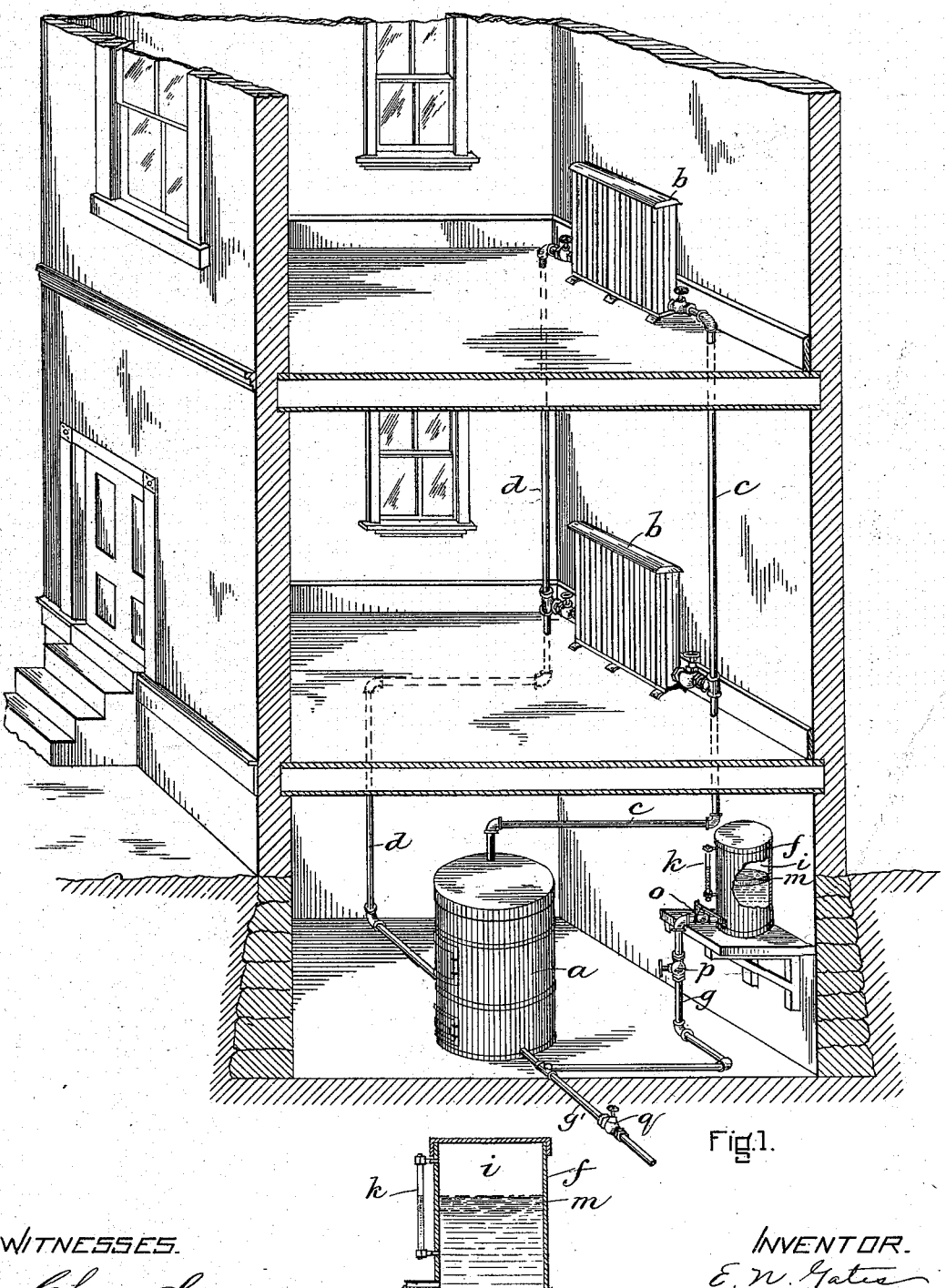

EUGENE N. GATES, OF FITCHBURG, MASSACHUSETTS, ASSIGNOR OF ONE-HALF TO H. F. COGGSHALL, OF SAME PLACE.

HEATING APPARATUS.

SPECIFICATION forming part of Letters Patent No. 401,940, dated April 23, 1889.

Application filed May 4, 1888. Serial No. 272,810. (No model.)

*To all whom it may concern:*

Be it known that I, EUGENE N. GATES, of Fitchburg, in the county of Worcester and State of Massachusetts, have invented certain new and useful Improvements in Heating Apparatus, of which the following is a specification.

This invention relates to apparatus for heating buildings by hot water heated in the basement or lower portion of a building and circulated through radiators in the rooms to be heated, the water rising from the heater to the radiators and returning to the heater after passing through the radiators.

My invention has for its object to provide improved means whereby the leakage of water from the system (within certain limits) may be automatically compensated for, and the water raised as fast as leakage occurs, so that no air-space will be formed at the highest parts of the system, unless the leakage is allowed to continue without reasonable care and attention.

To this end my invention consists in the combination, with a water heating and circulating system, of an air-tight chamber the lower portion of which communicates with the lower portion of the water jacket or heater, in which the water is heated by the furnace, a body of air confined in the upper part of chamber, which air supports the pressure of the water in all parts of the system above said chamber, and a movable diaphragm interposed between the air and water in said chamber to prevent the air from being absorbed by the water, said diaphragm being preferably a quantity of oil floating on the water and preventing contact of the air and water.

The invention also consists in certain details, all of which I will now proceed to describe and claim.

Of the accompanying drawings, forming a part of this specification, Figure 1 represents a perspective view of a hot-water heating system provided with my improvement, and a portion of a building to which the system is applied. Fig. 2 represents a vertical section of the air-chamber.

The same letters of reference indicate the same parts in both of the figures.

In the drawings, *a* represents a water-heater of any suitable pattern—as, for example, an annular water jacket or reservoir and a fire-pot surrounded thereby.

*b b* represent radiators located in apartments above the heater and connected with the upper portion of the heating-reservoir by a pipe or pipes, *c*, which conduct the hot water upwardly to the radiators, and with the lower portion of said reservoir by a pipe or pipes, *d*, which conduct the water back to the lower portion of the heating-reservoir after the water has passed through the radiators and given out a portion of its heat.

The above constitute the principal features of the hot-water heating system now in general use, the heating-reservoir, radiators, and supply and return pipes being in practice kept full of water which is in constant circulation.

*f* represents a chamber or reservoir, the lower portion of which is connected by a pipe, *g*, with the lower portion of the reservoir or water-space of the heater, said pipe being preferably a branch of a supply-pipe, *g'*, through which water may be introduced into the water-space of the heater from a street-main or other source of supply, although the pipe may be connected directly with the said water-space, if preferred. The chamber *f* is air-tight, and its upper portion is adapted to retain a body, *i*, of air to support the pressure of the water in those portions of the system which are higher than said chamber, and indicate approximately by its volume the quantity of water in the system, the water partly filling said chamber and compressing the air in the upper portion thereof.

It is very important that there be no variation in the quantity of air in the chamber *f*, as any loss of air from the chamber would cause a change in its expansive force. I have found that the air, if allowed to remain for any considerable length of time in contact with the water in the chamber *f*, becomes materially reduced by absorption, the water taking up so much of the air as to materially change the water-level. To remedy this difficulty, I interpose between the water and air in the chamber *f* a mobile air-proof diaphragm, whereby contact of the air with the water is prevented. The most convenient and practicable form of diaphragm for this purpose, of which I am aware, is a layer, $m$, of any suitable oil, the same floating upon the water and effectually sealing the air in the chamber, the oil being impervious to air.

It is obvious that other than oleaginous liquid materials may be used for the mobile diaphragm—sheet-rubber or oiled silk, for example; but if any material excepting oil is used it will be necessary to attach the diaphragm to the chamber $f$ in such manner as to prevent the passage of air around the diaphragm; hence I prefer oil, because of the ease with which it can be applied, and its comparative freedom from liability of deterioration as a diaphragm by use or age.

In the operation of the apparatus the pipes, radiators, and heating-receptacles of the heating system are first entirely filled with water, also the lower portion of the chamber $f$, a body of air being allowed to remain in the upper part of said chamber, which body acts as a cushion, receiving the pressure of all the water in the system located above it. The pressure of the compressed-air cushion on the water raises the water in the system sufficiently to partially compensate for ordinary leakage until the total amount of leakage allows the air-cushion to expand and reduce the water-level in the tank to a point which is so much lower than the water-level in said tank when the pipes and radiators were first filled and therefore were known to be full, as to plainly indicate a loss of water requiring replacement. The fluctuations of the water-level, caused by variations of temperature and water-pressure, (it being understood that, ordinarily, the water will not be raised above the boiling-point,) do not affect the operativeness of the apparatus, because only an approximate indication is required; hence said fluctuations require no attention until the water-level falls to such a point as to clearly indicate an amount of leakage requiring replacement, said point being lower than can possibly be caused by variations of pressure when the pipes and radiators of the system have a sufficient supply of water. In other words, the body of air in the chamber $f$ operates to keep the highest radiators filled, the air expanding and raising the water as fast as leakage occurs until the limit of the expansive force of the air is reached, this fact being indicated by the extreme depression of the water in the chamber $f$.

The pipe $g$, which connects the chamber $f$ with the water-space of the heater, is provided with a safety-valve, $o$, which opens and permits the escape of water from the system in case the pressure on the air in the chamber $f$ exceeds a predetermined degree. The pipe $g$ is also provided with a shut-off cock, $p$, whereby the water may be retained in the chamber $f$ in case the pipe $g$ and the chamber $f$ are disconnected from the system. The supply-pipe $g'$ is provided with a shut-off cock, $q$, at a point outside of its connection with the pipe $g$.

I have here shown the chamber $f$ as located in the same room with the heater, this being in most cases the most convenient location. It is obvious, however, that said chamber may be located at any other place below the highest part of the system, the pressure of the water on the air in the chamber varying with the elevation of the chamber.

I claim—

1. The combination, with a water heating and circulating system, of a chamber connected at its lower portion with said system and partly filled with the water of the system, a body of air which is compressed by the water-pressure, and a safety-valve whereby water may be released from the system when the pressure on the air exceeds a predetermined degree, as set forth.

2. The combination, with a water heating and circulating system, of a chamber connected at its lower portion with said system and partly filled with the water of the system, a body of air which is compressed by the water-pressure, and a mobile diaphragm interposed between the air and water in said chamber, as set forth.

3. The combination, with a water heating and circulating system, of a chamber connected at its lower portion with said system and partly filled with the water of said system, a body of air in said chamber supporting the pressure of the water, and a diaphragm of oil supported by the water in the chamber, as and for the purpose specified.

4. The combination, with a water heating and circulating system, of a water-supply-pipe, $g'$, connected directly with said system and provided with a shut-off cock, $q$, an air-chamber, $f$, a pipe, $g$, connecting the chamber $f$ with the said system, and a shut-off cock, $p$, in the pipe $g$, whereby the air-chamber may be shut off from the water heating and circulating system without interfering with the supply of water thereto by the supply-pipe $g'$.

In testimony whereof I have signed my name to this specification, in the presence of two subscribing witnesses, this 1st day of May, A. D. 1888.

EUGENE N. GATES.

Witnesses:
C. F. BROWN,
A. D. HARRISON.